United States Patent
Kimura

(10) Patent No.: US 10,514,049 B2
(45) Date of Patent: Dec. 24, 2019

(54) HYDRAULIC ACTUATOR AND TORQUE TRANSMISSION COUPLER

(71) Applicant: OGURA & CO., LTD., Kanagawa (JP)

(72) Inventor: Kiyoshi Kimura, Ebina (JP)

(73) Assignee: OGURA & CO., LTD., Kanagawa (JP)

( * ) Notice: Subject to any disclaimer, the term of this patent is extended or adjusted under 35 U.S.C. 154(b) by 225 days.

(21) Appl. No.: 15/601,138

(22) Filed: May 22, 2017

(65) Prior Publication Data
US 2018/0195532 A1    Jul. 12, 2018

Related U.S. Application Data

(63) Continuation-in-part of application No. PCT/JP2017/000288, filed on Jan. 6, 2017.

(51) Int. Cl.
*F15B 11/10* (2006.01)
*A62B 3/00* (2006.01)
(Continued)

(52) U.S. Cl.
CPC ............. *F15B 11/10* (2013.01); *A62B 3/005* (2013.01); *F04B 9/045* (2013.01); *F16C 1/06* (2013.01);
(Continued)

(58) Field of Classification Search
CPC .. F15B 11/10; F15B 2211/20546; F16C 1/06; F16D 41/064; F16D 41/069; F04B 9/045; A62B 3/005
(Continued)

(56) References Cited

U.S. PATENT DOCUMENTS 3,070,143 A * 12/1962 Klingler .................. B21J 15/22
                                                              137/463
4,458,418 A * 7/1984 McSmith ................ B25B 7/126
                                                              30/180
(Continued)

FOREIGN PATENT DOCUMENTS

CN         1380501 A        11/2002
CN         1910010 A         2/2007
(Continued)

OTHER PUBLICATIONS

Office Action issued in Japan Counterpart Patent Appl. No. 2017-078022, dated May 7, 2018, along with an English translation thereof.

(Continued)

*Primary Examiner* — Nathaniel C Chukwurah
(74) *Attorney, Agent, or Firm* — Greenblum & Bernstein, P.L.C.

(57) ABSTRACT

A hydraulic actuator includes a tool unit (10) having a tool that operates by pressurized oil generated by a hydraulic pump (40), a driving unit (60) that generates a rotation torque, and a torque transmission coupler (70) to one end of which the tool unit (10) is detachably attachable and to other end of which the driving unit (60) is detachably attachable and that transmits the rotation torque generated by the driving unit (60) to a rotatable member (41) of the tool unit (10). The torque transmission coupler (70) includes a flexible rod-like shaft (74) and a flexible cover (72) that surrounds an outer peripheral surface of the shaft. The torque transmission coupler (70) is bendable as the shaft (74) and the cover (72) have flexibility.

9 Claims, 9 Drawing Sheets

(51) Int. Cl.
  *F04B 9/04* (2006.01)
  *F16C 1/06* (2006.01)
  *F16D 41/064* (2006.01)
  *F16D 41/069* (2006.01)

(52) U.S. Cl.
  CPC ......... *F16D 41/064* (2013.01); *F16D 41/069* (2013.01); *F15B 2211/20546* (2013.01)

(58) Field of Classification Search
  USPC ......... 173/49; 137/315.01; 30/266; 254/104; 72/393
  See application file for complete search history.

(56) References Cited

U.S. PATENT DOCUMENTS

| | | | | |
|---|---|---|---|---|
| 6,000,680 | A * | 12/1999 | Kimura | B23D 29/00 254/93 R |
| 6,354,949 | B1 * | 3/2002 | Baris | B26B 25/002 464/176 |
| 2005/0223886 | A1 * | 10/2005 | Oide | B23D 15/14 91/428 |
| 2007/0259723 | A1 | 11/2007 | Bertani | |
| 2013/0174424 | A1 * | 7/2013 | Whited | A22B 5/165 30/276 |
| 2014/0034149 | A1 * | 2/2014 | Kimura | F16L 37/56 137/315.01 |

FOREIGN PATENT DOCUMENTS

| | | | |
|---|---|---|---|
| EP | 1338386 | 8/2003 | |
| JP | 1-243923 | 9/1989 | |
| JP | 2002-1682 | 1/2002 | |
| JP | 2003-148445 | 5/2003 | |
| JP | 2004/211828 A | 7/2004 | |
| JP | 2005-201285 | 7/2005 | |
| JP | 3902766 | 4/2007 | |
| JP | 2007-518581 | 7/2007 | |
| JP | 2010-280011 | 12/2010 | |
| WO | 03/064091 | 8/2003 | |
| WO | WO-03064091 A1 * | 8/2003 | ............. A62B 3/005 |

OTHER PUBLICATIONS

International Search Report, along with English-language translation thereof, issued in PCT/JP2017/000288 dated Mar. 21, 2017.
Written Opinion, along with English-language translation thereof, issued in PCT/JP2017/000288 dated Mar. 21, 2017.
Chinese Office Action dated Mar. 4, 2019 in Chinese Application No. 201710400078.6.
Official Communication issued in European Patent Office (EPO) Patent Application No. 17172135.0, dated Jan. 31, 2018.
Chinese Office Action dated Aug. 16, 2019 in Chinese Application No. 201710400078.6 with English Translation.

* cited by examiner

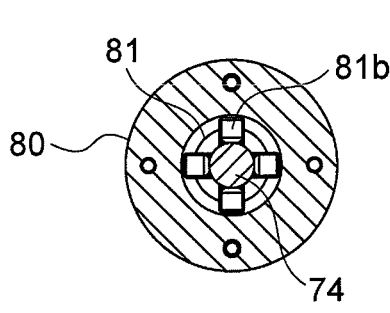
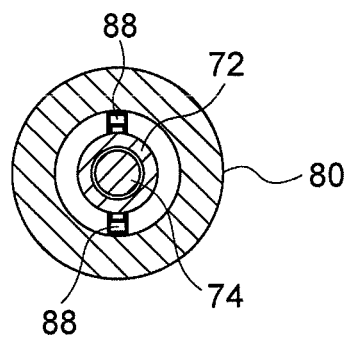
FIG. 9A  FIG. 9B
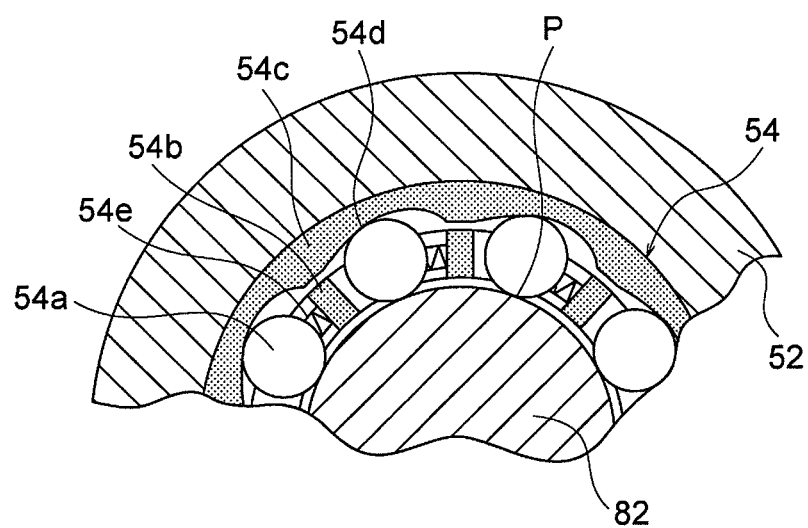
FIG. 10

HYDRAULIC ACTUATOR AND TORQUE TRANSMISSION COUPLER

CROSS-REFERENCE TO RELATED APPLICATION

This is a continuation-in-part of International Application No. PCT/JP2017/000288, filed on Jan. 6, 2017, the entire contents all of which are incorporated herein by reference.

BACKGROUND OF THE INVENTION

1. Field of the Invention

The present invention relates to a hydraulic actuator that operates by oil pressure and a torque transmission coupler that couples a driving unit to a tool unit in such a hydraulic actuator.

2. Description of the Related Art

A portable hydraulic actuator is sometimes used in a rescue operation. An example of such a hydraulic actuator is disclosed in Japanese Patent Application Laid-Open No. 2010-280011 (JP2010-280011A). The hydraulic actuator disclosed in Japanese Patent Application Laid-Open No. 2010-280011 includes a battery, an oil pressure generating unit including an electric motor that receives a power supply from the battery and a hydraulic pump that is driven by the electric motor, and a head unit that can be detachably attached to the oil pressure generating unit and including a tip tool driven by pressurized oil generated in the oil pressure generating unit. Various types of devices such as a cutter, a spreader, have been prepared as the tip tool included in the head unit allowing a great variety of operations to be performed by changing the head unit. Moreover, by making the oil pressure generating unit and the head unit separable from each other, portability is improved, and the load on an on-site worker can be reduced.

SUMMARY OF THE INVENTION

In the above-mentioned conventional hydraulic actuator, because the configuration is such that the head unit is attached directly to the oil pressure generating unit, it may not be used in a narrow place. Moreover, when used in places where there is a chance of occurrence of a secondary disaster, the operator who holds the grip of the oil pressure generating unit might be at a risk.

The present invention has been made in view of the above discussion. One object of the present invention is to provide a hydraulic actuator and a torque transmission coupler usable in the hydraulic actuator that can be used in a narrow place and a place where there is a chance of occurrence of a secondary disaster.

The hydraulic actuator of the present invention includes: a tool unit that includes a hydraulic pump that generates pressurized oil by rotating a rotatable member, and a tool operable by the pressurized oil generated by the hydraulic pump; a driving unit that generates a rotation torque; and a torque transmission coupler to a first end of which the tool unit is detachably attachable and to a second end of which the driving unit is detachably attachable and that transmits the rotation torque generated by the driving unit to the rotatable member of the tool unit, the torque transmission coupler includes a flexible rod-like shaft, which can also be referred to as a solid flexible shaft, as well as a flexible cover that surrounds an outer peripheral surface of the shaft, the rotation torque generated by the driving unit is transmitted to the rotatable member of the tool unit by rotation of the shaft inside the cover, and the torque transmission coupler is bendable as the shaft and the cover have flexibility.

In the hydraulic actuator of the present invention, a first detachable mechanism to which the tool unit can be detachably attached along an axial direction of the shaft may be arranged in the first end of the torque transmission coupler, and a second detachable mechanism to which the driving unit can be detachably attached along the axial direction of the shaft may be arranged in the second end of the torque transmission coupler.

Further, a first one-way clutch may be arranged on a first axis end of one of members between the rotatable member of the tool unit and the shaft of the torque transmission coupler to receive a second axis end of other one of the members, and the first one-way clutch may include a spring biased roller, ball, or sprag that directly contacts the second axis end when the second axis end has been received by the first one-way clutch.

Further, to maintain a state in which the second axis end has been received by the first axis end of one of the members between the rotatable member of the tool unit and the shaft of the torque transmission coupler, a first locking mechanism that fixes the tool unit to the torque transmission coupler in an axial direction of the rotatable member may be provided in the tool unit or the torque transmission coupler.

Further, the driving unit includes a motor and a rotation axis rotated by the motor, a second one-way clutch may be arranged on a first axis end of one of members between the rotation axis of the driving unit and the shaft of the torque transmission coupler to receive a second axis end of other one of the members, and the second one-way clutch may include a spring biased roller, ball, or sprag that directly contacts the second axis end when the second axis end has been received by the second one-way clutch.

Further, to maintain a state in which the second axis end has been received by the first axis end of one of the members between the rotation axis of the driving unit and the shaft of the torque transmission coupler, a second locking mechanism that fixes the driving unit to the torque transmission coupler in an axial direction of the rotation axis may be provided in the driving unit or the torque transmission coupler.

Further, a material of the shaft of the torque transmission coupler may be metal.

The torque transmission coupler of the present invention for coupling a tool unit that includes a hydraulic pump that generates pressurized oil by rotating a rotatable member and a tool operable by the pressurized oil generated by the hydraulic pump and a driving unit that generates a rotation torque, the torque transmission coupler of the present invention includes: a flexible rod-like shaft; and a flexible cover that surrounds an outer peripheral surface of the shaft, the torque transmission coupler is bendable as the shaft and the cover have flexibility, and the rotation torque generated by the driving unit is transmitted to the rotatable member of the tool unit by rotation of the shaft inside the cover.

In the torque transmission coupler of the present invention, a first detachable mechanism to which the tool unit can be detachably attached along an axial direction of the shaft may be arranged in a first end of the torque transmission coupler, and a second detachable mechanism to which the driving unit can be detachably attached along the axial direction of the shaft may be arranged in a second end of the torque transmission coupler.

BRIEF DESCRIPTION OF THE DRAWINGS

FIGS. 9(A) and 9(B) are longitudinal cross-sectional views of the receiving part of the torque transmission coupler shown in FIG. 7 when seen along arrows shown near a line A-A and a line B-B, respectively.

FIG. 10 is a longitudinal cross-sectional view of a detailed configuration of a one-way clutch of the attaching part of the tool unit shown in FIG. 7.

DESCRIPTION OF EMBODIMENT

Figure 1:
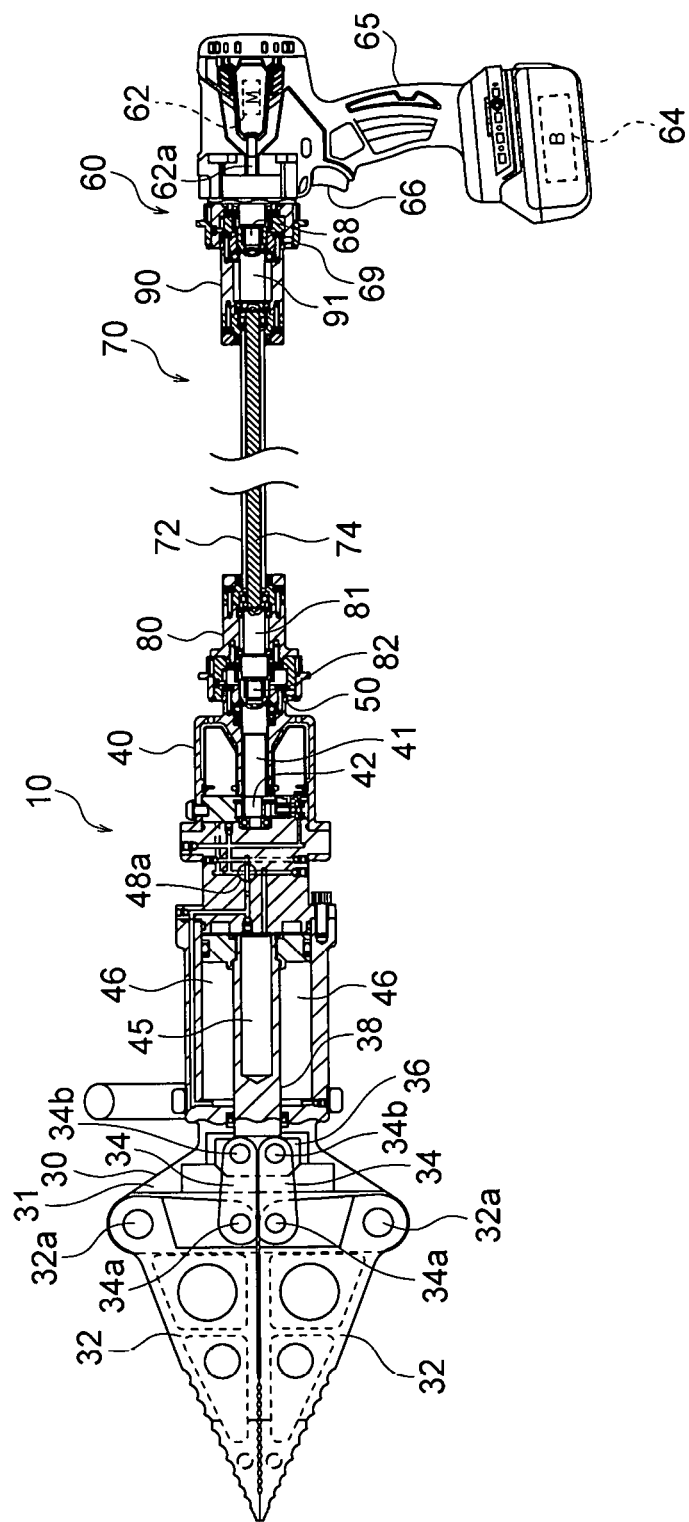
FIG. 1 is a side view, with a part shown as a cross-section, of a hydraulic actuator according to an embodiment of the present invention in a state in which a tool unit and a driving unit have been coupled by a torque transmission coupler.
Figure 2:
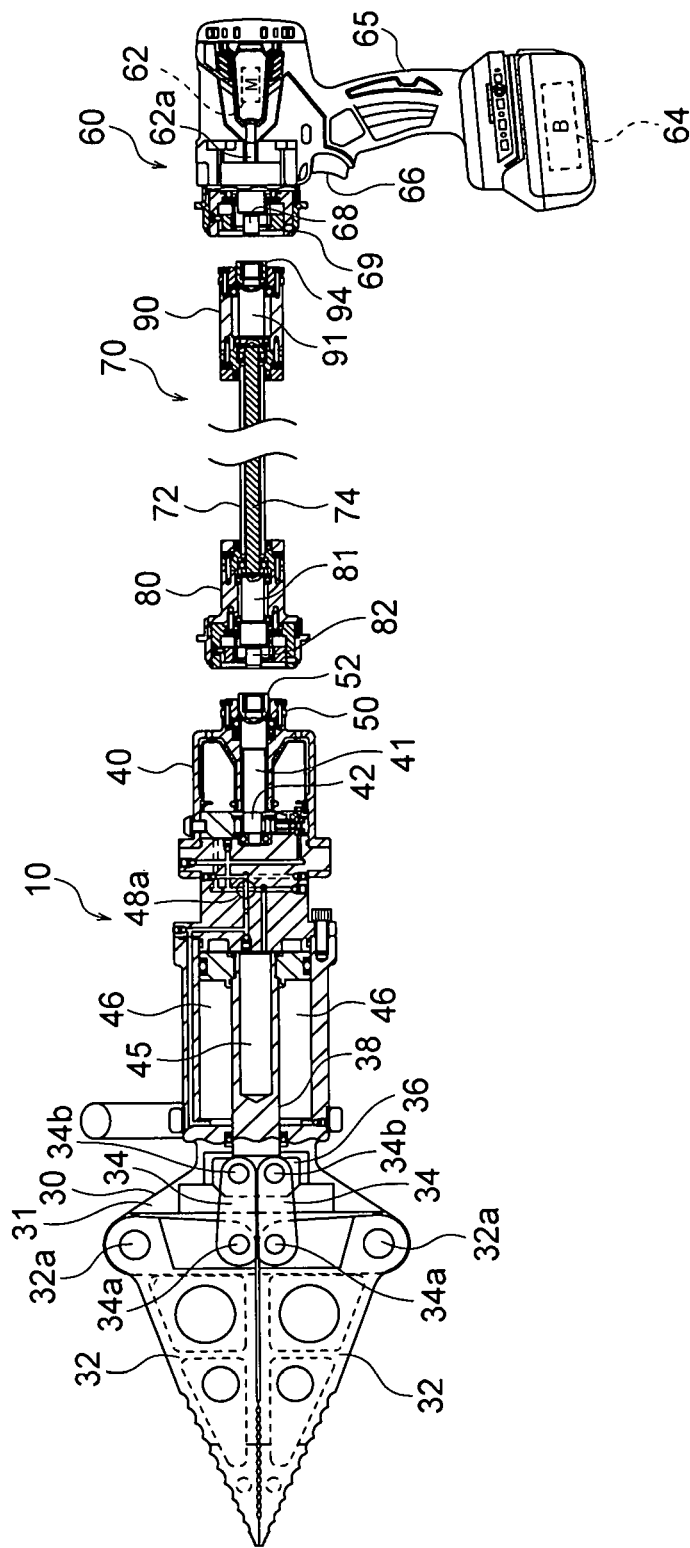
FIG. 2 is a side view, with a part shown as a cross-section, of the hydraulic actuator shown in FIG. 1 in a state in which the torque transmission coupler has been detached from both the tool unit and the driving unit.
Figure 3:
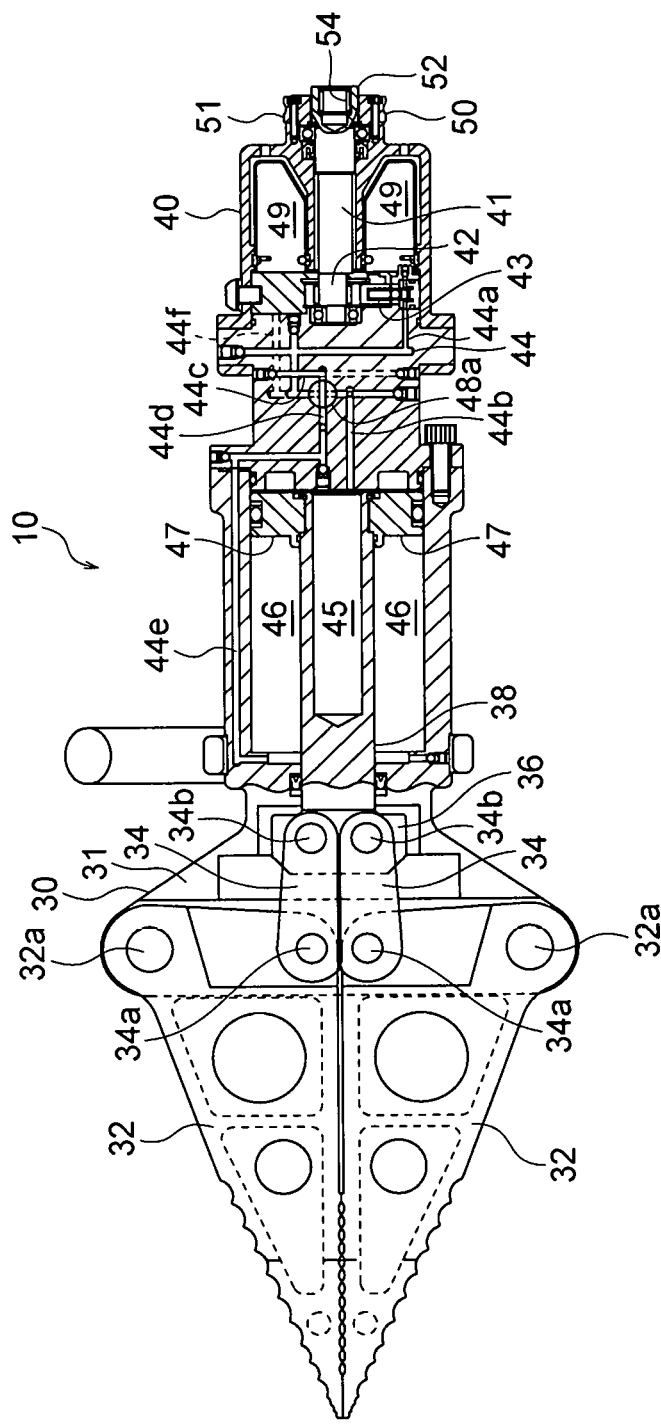
FIG. 3 is a side view, with a part shown as a cross-section, of a detailed configuration of the tool unit of the hydraulic actuator shown in FIG. 1.
Figure 4:
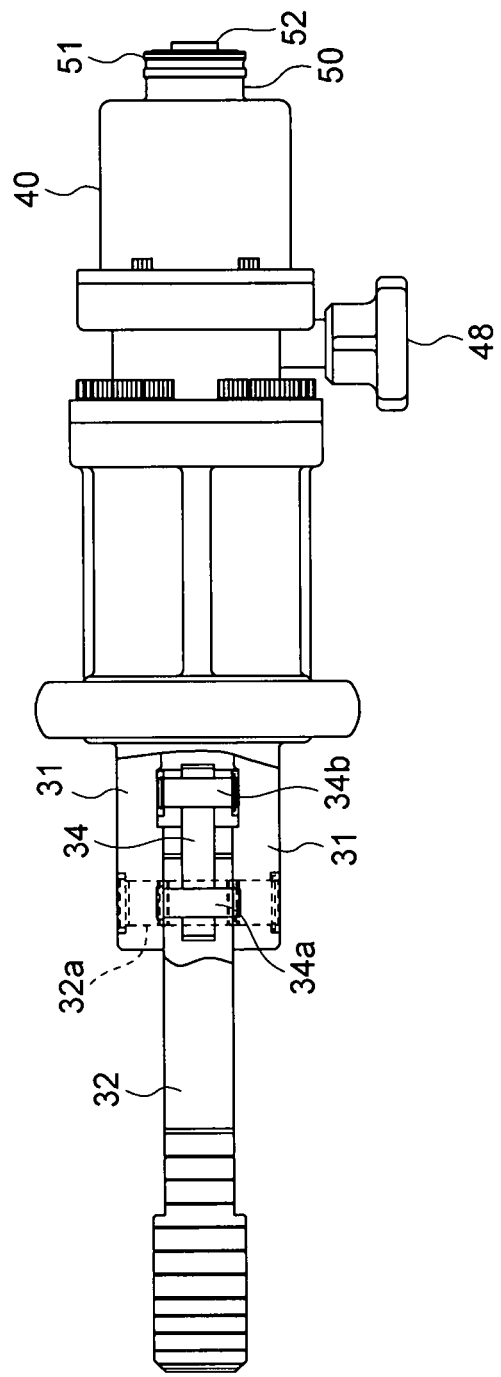
FIG. 4 is a top view of the tool unit shown in FIG. 3.
Figure 5:
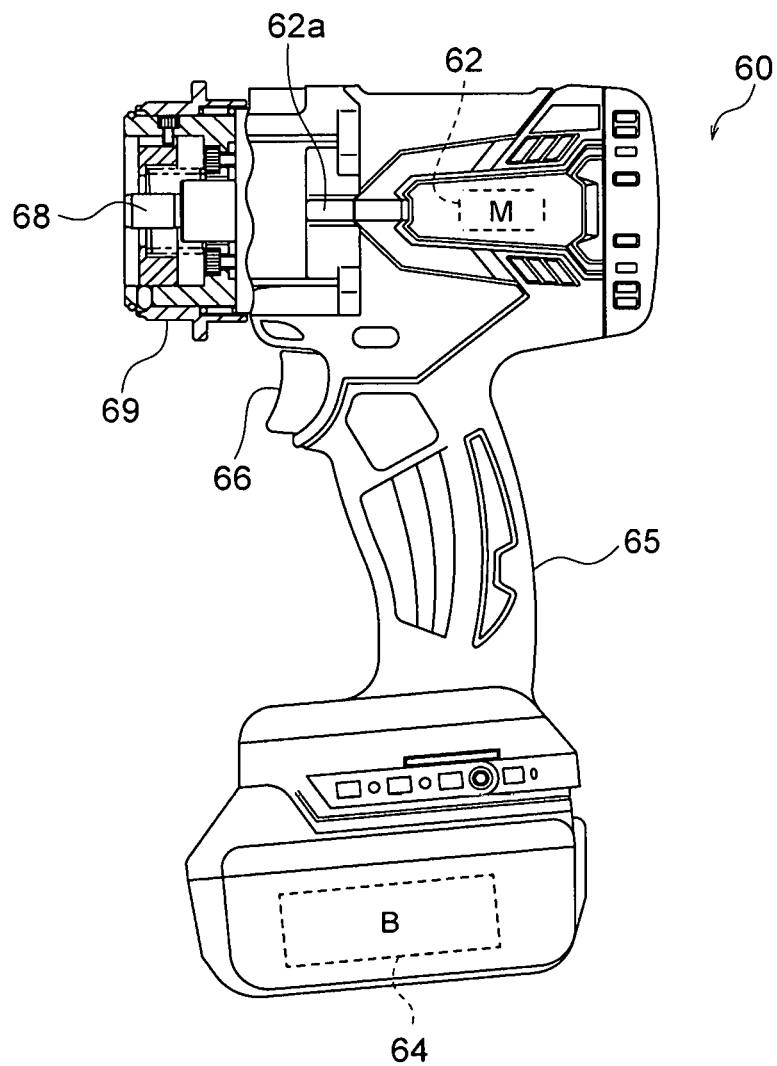
FIG. 5 is a side view, with a part shown as a cross-section, of a detailed configuration of the driving unit of the hydraulic actuator shown in FIG. 1.
Figure 6:
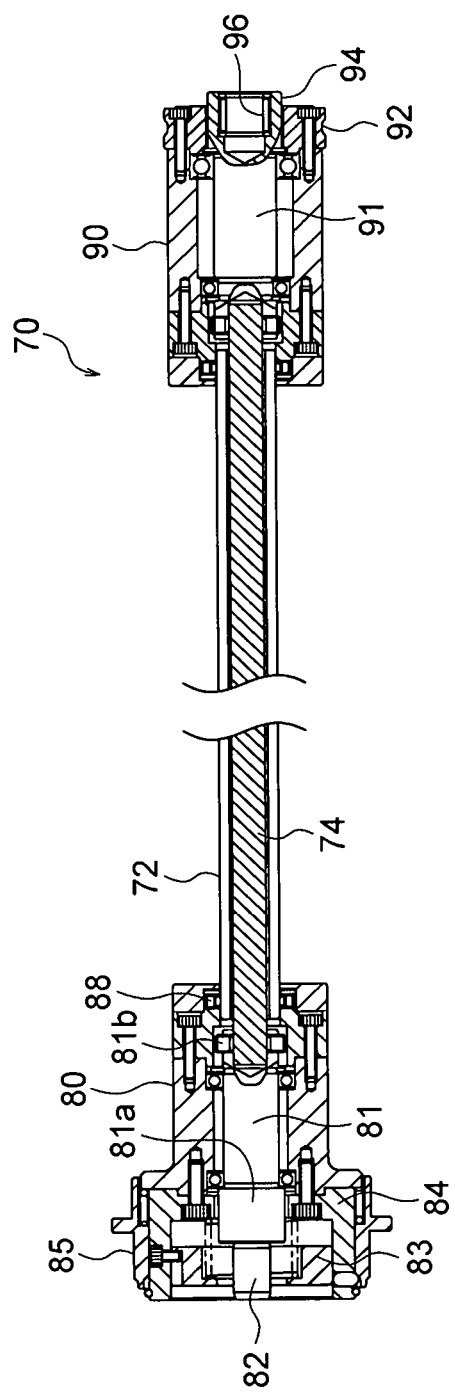
FIG. 6 is a cross-sectional side view of a detailed configuration of the torque transmission coupler of the hydraulic actuator shown in FIG. 1.

Exemplary embodiments of the present invention are explained below with reference to the accompanying drawings. The hydraulic actuator according to the present embodiment can be used in a rescue operation and the like. By using an appropriate tip tool, such as the spreader, the hydraulic actuator can be used to cut an object such as a reinforcing rod or to break open an object such as a door. FIGS. 1 to 10 depict the hydraulic actuator according to the present embodiment. Among them, FIG. 1 is a side view, with a part shown as a cross-section, of the hydraulic actuator according to the present embodiment in a state in which a tool unit and a driving unit have been coupled by a torque transmission coupler. FIG. 2 is a side view, with a part shown as a cross-section, of the hydraulic actuator shown in FIG. 1 in a state in which the torque transmission coupler has been detached from both the tool unit and the driving unit. FIG. 3 is a side view, with a part shown as a cross-section, of a detailed configuration of the tool unit of the hydraulic actuator shown in FIG. 1, and FIG. 4 is a top view of the tool unit. FIG. 5 is a side view, with a part shown as a cross-section, of a detailed configuration of the driving unit of the hydraulic actuator shown in FIG. 1, and FIG. 6 is a cross-sectional side view of a detailed configuration of the torque transmission coupler of the hydraulic actuator shown in FIG. 1. Moreover, FIGS. 7 to 10 are views of a detailed configuration of an attaching part of the tool unit and a receiving part of the torque transmission coupler in the hydraulic actuator shown in FIG. 1.

As shown in FIGS. 1 and 2, the hydraulic actuator according to the present embodiment includes a tool unit 10 including a hydraulic pump 40 that generates pressurized oil by rotating a later-explained rotatable member 41, and a tool 30 that is operated by the pressurized oil generated by the hydraulic pump 40, a driving unit 60 including a motor 62, and a torque transmission coupler 70 with one end (first end) thereof detachably attachable to the tool unit 10 and the other end (second end) thereof detachably attachable to the driving unit 60. The rotation torque generated by the motor 62 of the driving unit 60 is transmitted to the rotatable member 41 of the tool unit 10 by the torque transmission coupler 70. Moreover, in the hydraulic actuator according to the present embodiment, as shown in FIG. 2, the torque transmission coupler 70 can be detached from both the tool unit 10 and the driving unit 60. A detailed explanation of various structural components of the hydraulic actuator is given below.

A detailed explanation of a configuration of the tool unit 10 is given below by using FIGS. 3 and 4. As shown in FIG. 3, the tool unit 10 has a structure in which the hydraulic pump 40 and the tool 30, such as the spreader, that is operated by the pressurized oil generated by the hydraulic pump 40 are integrated. The tool 30 has a pair of blades 32 that can be opened and closed by the action of the pressurized oil. In the closed state of the blades 32, the tips of the blades 32 are inserted into a narrow gap between an object, such as doors, and the gap can be widened by opening the blades 32. In this manner, for example, when a person who needs to be rescued is blocked up in a space shut by a door that cannot be opened with an ordinary method, such a door can be break opened with the tool 30. Moreover, because the narrow gap can be widened forcibly by the action of oil pressure with the blades 32 of the tool 30, the hydraulic actuator according to the present embodiment can also be used to lift a heavy object. For example, one of the blades 32 is put on a hard platform, and by opening the blades 32 in a state in which the other blade 32 is in touch with a lower surface of the object to be lifted, the object can be lifted. The tool 30 of the tool unit 10 in the hydraulic actuator according to the present embodiment is not limited to the spreader. As far as the tool can be operated by the action of the pressurized oil generated by the hydraulic pump, other than the spreader, any tool (for example, a cutter that can cut a reinforcing rod and the like) can be used as the tool 30 of the tool unit 10.

As shown in FIG. 3 and the like, the tool 30 includes a base part 31, the pair of blades 32 pivotable with respect to the base part 31 around shafts 32a, a pair of operating members 34 that operates the pair of the blades 32, and an attachment member 36 attached to a later-explained piston rod 38. A shaft 34a is arranged at an end portion of each of the operating members 34. Each of the blades 32 is attached to the corresponding shaft 34a to be rotatable with respect to the corresponding operating member 34 around the corresponding shaft 34a. Moreover, a shaft 34b is arranged at a base end portion of each of the operating members 34. Each of the operating members 34 is rotatable with respect to the attachment member 36 around the corresponding shaft 34b. In the state shown in FIG. 3, when the attachment member 36 is pressed and moved by the piston rod 38 toward the left direction in FIG. 3, because each of the operating members 34 is pressed and moved by the attachment member 36 toward the left direction in FIG. 3, the operating members 34 rotate with respect to the attachment member 36 around the shafts 34b so as to separate from each other. As a result, each of the blades 32 that is rotatable with respect to the corresponding operating member 34 around the corresponding shaft 34a, by being pressed and moved by the corresponding operating member 34, rotates around the corresponding shaft 32a so as to separate from each other. Accordingly, the blades 32 are opened from the state shown in FIG. 3. On the other hand, when the piston rod 38 moves toward the right direction in FIG. 3 while the blades 32 are open whereby the attachment member 36 attached to the piston rod 38 moves toward the right direction in FIG. 3, the blades 32 rotate around the shafts 32a so as to approach each other as the operating members 34 are pulled toward the right direction in FIG. 3 by the attachment member 36. As a result, the blades 32 are closed in the manner shown in FIG. 3.

As shown in FIG. 3 and the like, the hydraulic pump 40 includes an oil chamber 49, an eccentric part 42 attached to an end portion of the later-explained rod-like rotatable member 41, and a piston 43 that moves vertically when the eccentric part 42 rotates. The eccentric part 42 is eccentric to an axis of the rotatable member 41. A bearing 42a (see FIG. 7), such as a needle roller bearing, is attached to an outer peripheral surface of the eccentric part 42. Moreover, the piston 43 is always pressed on an outer peripheral surface of the bearing 42a by a not-shown spring. Therefore, when the rotatable member 41 rotates, the eccentric part 42 and the bearing 42a rotate eccentrically around the axis of the rotatable member 41 whereby the piston moves vertically. As a result, the pressurized oil is sent toward the tool 30 from the oil chamber 49 to operate the tool 30.

As shown in FIG. 3 and the like, an oil passage 44 for sending the pressurized oil from the oil chamber 49 of the hydraulic pump 40 to the tool 30 and returning return oil from the tool 30 to the oil chamber 49 is arranged inside the tool unit 10. The oil passage 44 includes a first oil passage 44a, a second oil passage 44b, a third oil passage 44c, and a fourth oil passage 44d. The first oil passage 44a and the second oil passage 44b are sectioned by a core body 48a of a switching valve 48 (see FIG. 4). The first oil passage 44a and the third oil passage 44c communicate with each other. The third oil passage 44c and the fourth oil passage 44d are also sectioned by the core body 48a of the switching valve 48. An oil passage is also formed inside the core body 48a of the switching valve 48. When the core body 48a is at a position shown in FIG. 3, the third oil passage 44c and the fourth oil passage 44d communicate with each other via the oil passage formed inside the core body 48a. Note that, when the core body 48a of the switching valve 48 is at the position shown in FIG. 3, the first oil passage 44a and the second oil passage 44b are disconnected from each other by the core body 48a. When the operator rotates the switching valve 48 from the state shown in FIG. 3 so that the core body 48a rotates by 90 degrees, the first oil passage 44a and the second oil passage 44b start communicating with each other via the oil passage formed inside the core body 48a. Note that, in this case, the third oil passage 44c and the fourth oil passage 44d are disconnected from each other by the core body 48a of the switching valve 48.

As shown in FIG. 3 and the like, a second oil chamber 46 is arranged on an outer side of the piston rod 38, and the second oil chamber 46 communicates with the fourth oil passage 44d via a fifth oil passage 44e.

Moreover, as shown in FIG. 3 and the like, a return oil passage 44f is provided for returning the return oil from the tool 30 to the oil chamber 49 of the hydraulic pump 40. The second oil passage 44b and the return oil passage 44f are sectioned by the core body 48a of the switching valve 48. When the core body 48a is at the position shown in FIG. 3, the second oil passage 44b and the return oil passage 44f communicate with each other via the oil passage formed inside the core body 48a. The fourth oil passage 44d and the return oil passage 44f are sectioned by the core body 48a of the switching valve 48. When the operator rotates the switching valve 48 from the state shown in FIG. 3 so that the core body 48a rotates by 90 degrees, the fourth oil passage 44d and the return oil passage 44f start communicating with each other via the oil passage formed inside the core body 48a.

As shown in FIG. 3, a first oil chamber 45 is provided inside the piston rod 38, and the first oil chamber 45 communicates with the second oil passage 44b. More particularly, a base end portion of the piston rod 38 is provided with a flange 47, and the pressurized oil sent from the second oil passage 44b to the tool 30 enters a region that is on the right side than the flange 47 and also enters into the first oil chamber 45 provided inside the piston rod 38. Therefore, when the hydraulic pump 40 operates after the core body 48a of the switching valve 48 is rotated by 90 degrees from the state shown in FIG. 3 and the pressurized oil is sent from the second oil passage 44b to the first oil chamber 45 and the region that is on the right side than the flange 47, the flange 47 and the piston rod 38 are pushed in the left direction in FIGS. 3 and 4. In this manner, when the piston rod 38 is pushed in the left direction in FIGS. 3 and 4, the pair of blades 32 in the tool 30 opens. At this time, the return oil returns from the second oil chamber 46 to the oil chamber 49 of the hydraulic pump 40 via the fifth oil passage 44e, the fourth oil passage 44d, and the return oil passage 44f in this order.

Moreover, as explained above, the second oil chamber 46 is arranged on the outer side of the piston rod 38, and the second oil chamber 46 communicates with the fourth oil passage 44d via the fifth oil passage 44e. Therefore, when the hydraulic pump 40 operates when the core body 48a of the switching valve 48 is at the position as shown in FIG. 3, the pressurized oil is sent to the second oil chamber 46 via the third oil passage 44c, the fourth oil passage 44d, and the fifth oil passage 44e in this order so that the flange 47 is pushed toward the right direction in FIGS. 3 and 4, whereby the piston rod 38 is also pushed in the right direction in FIGS. 3 and 4. When the piston rod 38 is pushed in the right direction in FIGS. 3 and 4 in this manner, the blades 32 in the tool 30 are closed. At this time, the return oil is returned from the first oil chamber 45 to the oil chamber 49 of the hydraulic pump 40 via the second oil passage 44b and the return oil passage 44f in this order.

Moreover, a base end portion of the tool unit 10 is provided with an attaching part 50 for attaching one end of the torque transmission coupler 70. A detailed configuration of the attaching part 50 will be explained later.

A detailed explanation of a configuration of the driving unit 60 is given below by using FIG. 5. As shown in FIG. 5, the motor 62, such as an electric motor, is arranged inside the driving unit 60. A rotation axis 62a attached to the motor 62 is rotated by the motor 62. Moreover, the driving unit 60 has a grip 65 for the operator to hold with a hand. A switch 66 is arranged in the grip 65. The operator who holds the grip 65 in his hand can operate the switch 66 with his finger. The switch 66 functions as an operating unit to operate the motor 62. Moreover, a battery 64 constituted by a secondary battery, such as a lithium ion battery or a nickel hydrogen battery, is arranged in a lower part of the driving unit 60. When the operator operates the switch 66, electric power is supplied to the motor 62 from the battery 64. Moreover, an end portion of the driving unit 60 is provided with a receiving part 69 for receiving the other end of the torque transmission coupler 70. A detailed configuration of the receiving part 69 will be explained later.

A detailed explanation of a configuration of the torque transmission coupler 70 is given below by using FIG. 6. As shown in FIG. 6, the torque transmission coupler 70 includes a flexible rod-like shaft 74, which can also be referred to as a solid flexible shaft, as well as a flexible protective cover 72 that encloses an outer peripheral surface of the shaft 74. The rod-like shaft 74 has, for example, a configuration in which a special hard steel wire is wound clockwise and counterclockwise alternately in several layers. The rod-like shaft 74 transmits a rotation torque and has flexibility. A configuration of the rod-like shaft 74 is not limited to the configuration mentioned here, and it can be made from any other metal material such as stainless steel. Moreover, the rod-like shaft 74 can be made from a material that is not metal. The torque transmission coupler 70 is bendable as the shaft 74 and the protective cover 72 have flexibility. Moreover, one end of the protective cover 72 of the torque transmission coupler 70 is provided with a receiving part 80 for detachably attaching the attaching part 50 provided to the base end portion of the tool unit 10. Moreover, the other end of the protective cover 72 is provided with an attaching part 90 for detachably attaching into the receiving part 69 provided to the end portion of the driving unit 60. Detailed configurations of the receiving part 80 and the attaching part 90 will be explained later.

Figure 7:
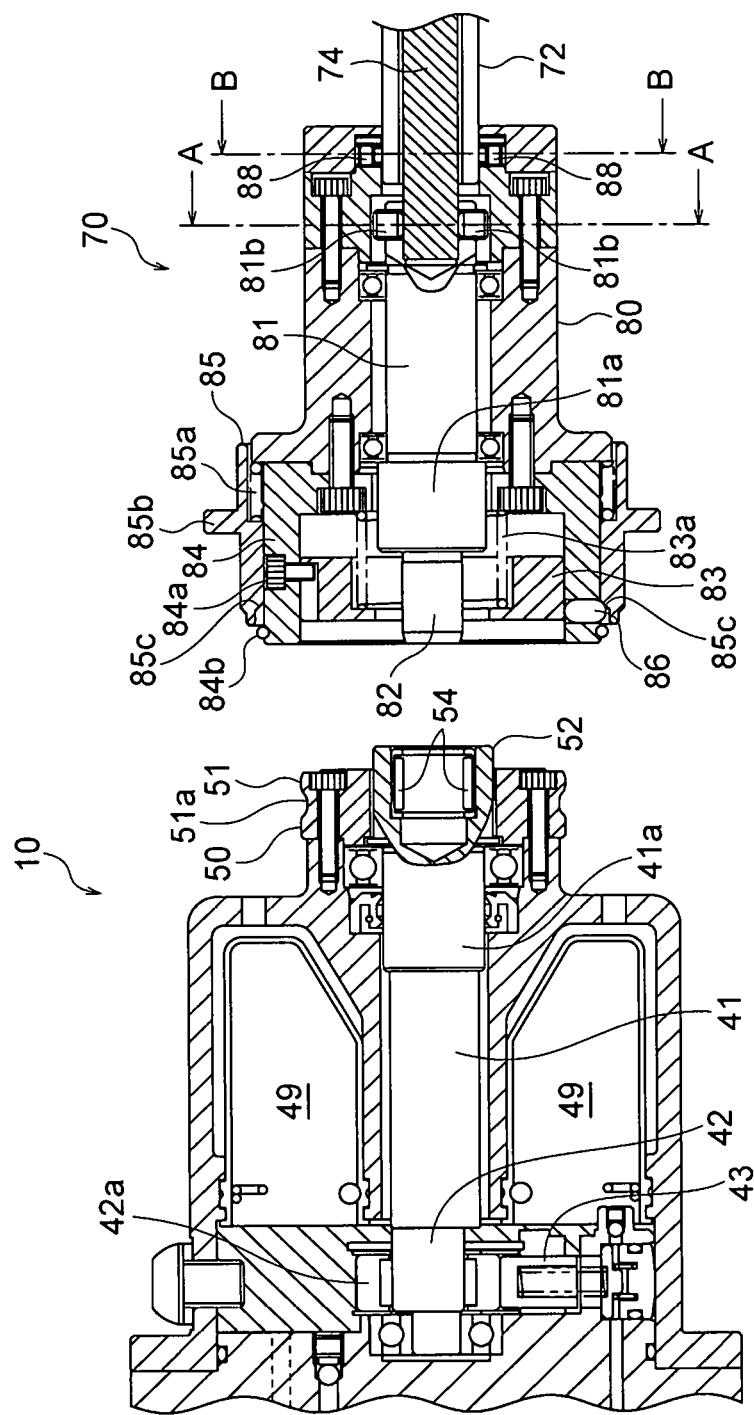
FIG. 7 is a cross-sectional side view of a detailed configuration of an attaching part of the tool unit and a receiving part of the torque transmission coupler in the hydraulic actuator shown in FIG. 1.
Figure 8:
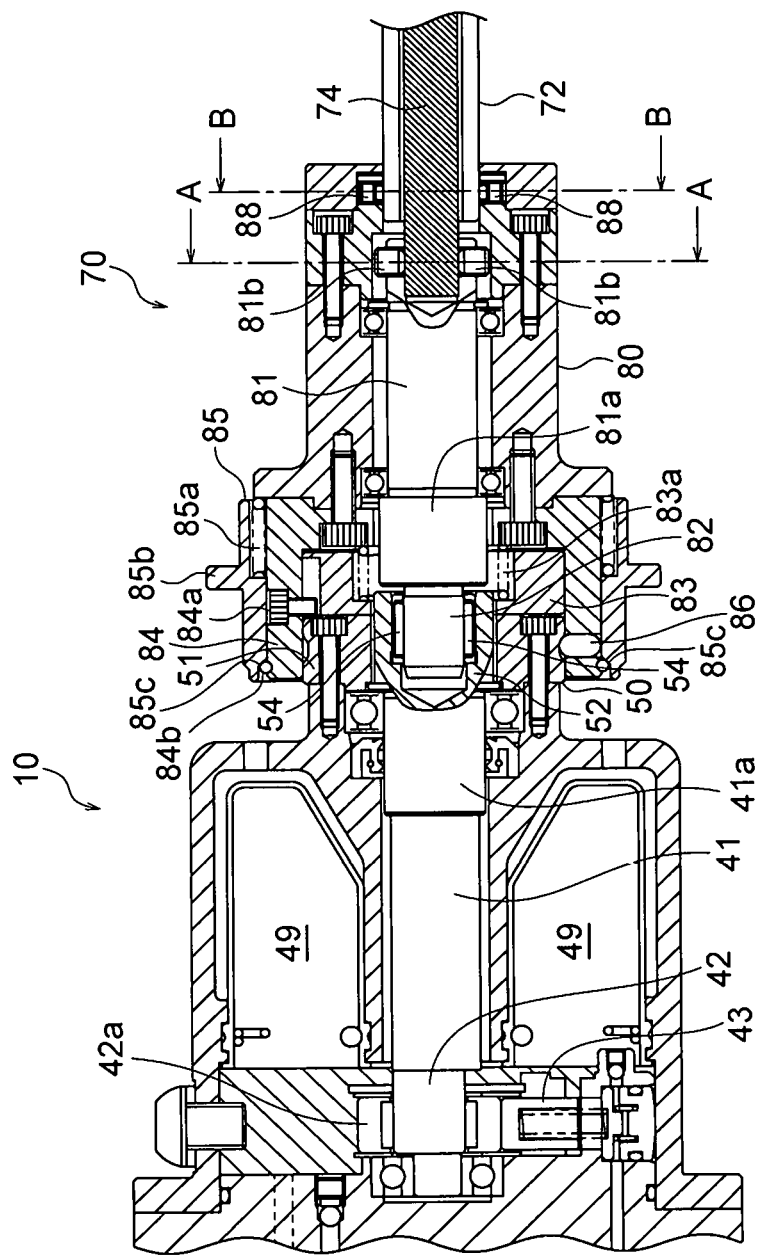
FIG. 8 is a cross-sectional side view of a state in which the attaching part of the tool unit shown in FIG. 7 has been attached to the receiving part of the torque transmission coupler.

A detailed explanation of the configurations of the attaching part 50 of the tool unit 10 and the receiving part 80 of the torque transmission coupler 70 is given below by using FIGS. 7 to 10. FIG. 7 is a cross-sectional side view of the detailed configurations of the attaching part 50 of the tool unit 10 and the receiving part 80 of the torque transmission coupler 70. FIG. 8 is a cross-sectional side view of a state in which the attaching part 50 of the tool unit 10 shown in FIG. 7 is attached to the receiving part 80 of the torque transmission coupler 70. FIGS. 9(A) and 9(B) are longitudinal cross-sectional views of the receiving part 80 of the torque transmission coupler 70 shown in FIGS. 7 and 8 when seen along arrows near a line A-A and a line B-B, respectively. FIG. 10 is a longitudinal cross-sectional view of a detailed configuration of a one-way clutch 54 of the attaching part 50 of the tool unit 10.

As shown in FIGS. 7 and 8, in the receiving part 80 of the torque transmission coupler 70, a rotatable member 81 is connected to an end portion of the rod-like shaft 74, and an inserting part 82 is attached to an end portion 81a of the rotatable member 81. More particularly, as shown in FIG. 9(B), a base end portion of the receiving part 80 is provided with an opening, and the protective cover 72 can be inserted into this opening. Moreover, the protective cover 72 that has been inserted into the opening of the receiving part 80 is fixed inside of the opening of the receiving part 80 by a plurality of (for example, two) screws 88. Moreover, as shown in FIG. 9(A), a base end portion of the rotatable member 81 is provided with a hole, and an end portion of the rod-like shaft 74 can be inserted into this hole. Moreover, the shaft 74 that has been inserted into the hole of the rotatable member 81 is fixed inside the hole of the rotatable member 81 by a plurality of (for example, four) screws 81b. In the present embodiment, the receiving part 80 constitutes a first detachable mechanism that allows the torque transmission coupler 70 to be detachably attached to the tool unit 10 along an axial direction of the shaft 74.

Moreover, a cylindrical receiving part 52 for inserting the inserting part 82 of the torque transmission coupler 70 is attached to an end portion 41a of the rotatable member 41 of the tool unit 10. The one-way clutch 54 (first one-way clutch) is attached inside a hole formed in the receiving part 52. As shown in FIG. 10, the one-way clutch 54 includes a plurality of needles (needle roller) 54a, a retainer 54b that holds the corresponding needle 54a so that the needle does not fall off when the inserting part 82 of the torque transmission coupler 70 has not been inserted into the one-way clutch 54, an outer race 54c on an inner peripheral side of which is formed a cam surface 54d corresponding to each of the needles 54a, and a spring 54e that applies a bias to maintain a state in which the corresponding needle 54a contacts the inserting part 82 of the torque transmission coupler 70.

The outer race 54c is press-fit in the hole provided in the receiving part 52 of the tool unit 10 and the outer race 54c and the receiving part 52 cannot rotate relative to each other. It is allowable to make the outer race 54c and the receiving part 52 non-rotatable relative to each other by a method other than the press fitting. Moreover, it is desirable that an outer diameter of the inserting part 82 of the torque transmission coupler 70 is slightly larger than a diameter of a circle that passes through a point P on a peripheral surface of the needle 54a located nearest to a central axis of the one-way clutch 54 when the inserting part 82 has not been inserted into the one-way clutch 54. When an attempt is made to insert the inserting part 82 of the torque transmission coupler 70 into the one-way clutch 54, because the needles 54a are moved in the clockwise direction in FIG. 10 against the force of the springs 54e, the inserting part 82 of the torque transmission coupler 70 can be inserted into the one-way clutch 54.

In FIG. 10, when the inserting part 82 of the torque transmission coupler 70 is rotated in the counterclockwise direction, the needles 54a move to locking positions (specifically, positions shifted in the counterclockwise direction from the positions shown in FIG. 10), whereby the relative rotation between the inserting part 82 and the outer race 54c of the one-way clutch 54 is prohibited (locked state). In this state, the rotation torques of the shaft 74 and the rotatable member 81 of the torque transmission coupler 70 are directly transmitted to the receiving part 52 and the rotatable member 41 of the tool unit 10 via the needles 54a and the outer race 54c. As a result, the hydraulic pump 40 operates and the blades 32 of the tool 30 can be opened or closed.

Alternatively, in FIG. 10, if the inserting part 82 of the torque transmission coupler 70 does not rotate further in the counterclockwise direction, the locked state of the one-way clutch 54 is released and the inserting part 82 can be easily pulled out from the one-way clutch 54.

In the hydraulic actuator according to the present embodiment, to maintain the state in which the inserting part 82 of the torque transmission coupler 70 has been received in the one-way clutch 54, a first locking mechanism is provided that fixes the tool unit 10 to the torque transmission coupler 70 with respect to an axial direction of the rotatable member 41. A detailed explanation of the first locking mechanism will be given below.

In the receiving part 80 of the torque transmission coupler 70, a first ring member 83 is provided around the inserting part 82 such that a certain gap is secured between the first ring member 83 and the inserting part 82. Moreover, a second ring member 84 is provided around the first ring member 83. Furthermore, a third ring member 85 is provided around the second ring member 84. While the second ring member 84 is fixed to the receiving part 80 and immovable, each of the first ring member 83 and the third ring member 85 is slidable with respect to the second ring member 84 along an axial direction of the rotatable member 81.

More particularly, as shown in FIGS. 7 and 8, the first ring member 83 is slidable along the axial direction of the rotatable member 81 inside the second ring member 84. Moreover, the first ring member 83 is biased in the left direction in FIG. 7 and FIG. 8 by a spring 83a. A bolt 84a is attached to the second ring member 84, and the movement of the first ring member 83 in the left direction in FIGS. 7 and 8 is restricted by an end portion of the bolt 84a.

The third ring member 85 is slidable on an outer peripheral surface of the second ring member 84 along the axial direction of the rotatable member 81. Moreover, the third ring member 85 is biased in the left direction in FIGS. 7 and 8 by a spring 85a. A stopper 84b is arranged on the outer peripheral surface of the second ring member 84, and the movement of the third ring member 85 in the left direction in FIGS. 7 and 8 is restricted by the stopper 84b. Moreover, an outer peripheral surface of the third ring member 85 is provided with a flange 85b that allows the operator to slide the third ring member 85.

Moreover, a plurality of holes (only one hole is shown in FIGS. 7 and 8 for convenience) is formed at certain interval on the second ring member 84 in a circumferential direction thereof. A pin 86 having an oval cross-section is arranged inside each of the holes. When, from the separated state shown in FIG. 7 of the tool unit 10 and the torque transmission coupler 70, the inserting part 82 of the torque transmission coupler 70 is inserted into the one-way clutch 54 provided in the receiving part 52 of the tool unit 10, because of a pushing member 51 provided to the attaching part 50 of the tool unit 10, the first ring member 83 is pushed toward the right direction in FIG. 7 and FIG. 8. When the pin 86 is aligned with a notch 51a formed on the surface of the pushing member 51, the pin 86 is pushed into the notch 51a. A force with which the pin 86 is pushed into the notch 51a is generated when the pin 86 is pushed by an inclined surface 85c present at an end portion of the third ring member 85 that is biased in the left direction in FIGS. 7 and 8 by the spring 85a. The inclined surface 85c collides with the stopper 84b after crossing the pin 86 after pushing the pin 86 into the notch 51a. A state after the completion of the operation of coupling the torque transmission coupler 70 to the tool unit 10 is shown in FIG. 8. By the insertion of the pin 86 into the notch 51a as shown in FIG. 8, the tool unit 10 and the torque transmission coupler 70 are fixed to each other with respect to the axial direction of the rotatable member 41.

To switch the state to the decoupled state shown in FIG. 7 from the coupled state shown in FIG. 8, while holding the flange 85b of the third ring member 85, the third ring member 85 is moved against the force of the spring 85a toward the right direction in FIGS. 7 and 8. As a result, the pin 86 comes out of the notch 51a. Accordingly, by the force of the spring 83a, the first ring member 83 pushes the pushing member 51 provided in the attaching part 50 of the tool unit 10 toward the left direction in FIGS. 7 and 8 from inside of the second ring member 84. With this, an inclined surface that is an inner surface of the notch 51a pushes the pin 86 outward. As a result, the inserting part 82 of the torque transmission coupler 70 comes out of the one-way clutch 54 and the decoupled state shown in FIG. 7 is obtained. Note that FIG. 7 shows a situation in which the operator has applied a force to attempt a movement of the flange 85b of the third ring member 85 toward the right direction in FIG. 7.

According to the attaching part 50 of the tool unit 10 and the receiving part 80 of the torque transmission coupler 70 having the configuration shown in FIGS. 7 to 10, irrespective in which rotation phase the inserting part 82 attached to the rotatable member 81 of the torque transmission coupler 70 is, it can be as is inserted into the one-way clutch 54 of the tool unit 10. Typically, the coupling of two rotation axes allowing transmission of power therebetween needs to be performed by using a structure, such as a key and a key notch, that prohibits relative rotation of both the rotation axes, so that an operation to match the rotation phases of both the rotation axes becomes necessary. In contrast, in the hydraulic actuator according to the present embodiment, because the one-way clutch 54 has been used, the operation to match the rotation phases becomes unnecessary. Accordingly, the operation of coupling the torque transmission coupler 70 to the tool unit 10 can be simplified greatly.

The one-way clutch 54 that can be used in the hydraulic actuator according to the present embodiment satisfies the following two conditions:

(a) that the needles 54a directly contact an outer peripheral surface of the inserting part 82 (that is, no inner race is provided that directly contacts the outer peripheral surface of the inserting part 82), and (b) that the needles 54a are biased by the springs 54e, the needles 54a escape and do not interfere with the insertion of the inserting part 82 when the inserting part 82 is inserted into the one-way clutch 54, and the contact between the needles 54a and the outer peripheral surface of the inserting part 82 is maintained (not lost) because of the elasticity of the springs 54e even when the needles 54a have escaped.

With regard to the condition (a), assuming that the one-way clutch 54 is provided with the inner race that contacts the inserting part 82, the key and the key notch structure or an engagement coupling must be formed to achieve a torque transmission coupling between the inserting part 82 and the inner race. In this case, it is necessary to perform the matching of the rotation phases of the inserting part 82 of the torque transmission coupler 70 and the receiving part 52 of the tool unit 10.

In the present embodiment, a one-way clutch having balls can be used instead of the one-way clutch 54 having the needles 54a. Moreover, in the present embodiment, because it is not necessary to make the rotation of the rotatable member 41 smooth in a direction opposite to the rotation direction for driving the hydraulic pump 40, a one-way clutch having sprags can be used. These one-way clutches also satisfy the conditions (a) and (b) (in this case, the needles 54a mentioned in the conditions (a) and (b) will be replaced with the balls or the sprags).

Moreover, instead of providing the one-way clutch 54 to the receiving part 52, which is attached to an axis end of the rotatable member 41 of the tool unit 10, the one-way clutch can be provided to an axis end of the rotatable member 81 of the torque transmission coupler 70. To realize this configuration, a hole is formed in a tip portion of the rotatable member 81 of the torque transmission coupler 70 for attaching the one-way clutch, and an inserting part for inserting into the one-way clutch is provided at an axis end of the rotatable member 41 of the tool unit 10.

Moreover, in the hydraulic actuator according to the present embodiment, the attaching part 90, which is provided at the other end of the shaft 74 in the torque transmission coupler 70, has substantially the same configuration as that of the attaching part 50 of the tool unit 10. Moreover, the receiving part 69 that is provided in the driving unit 60 has substantially the same configuration as that of the receiving part 80 of the torque transmission coupler 70. Specifically, as shown in FIGS. 1, 2, and 5, in the receiving part 80 of the driving unit 60, an inserting part 68 is attached to an end portion of the rotation axis 62*a* that is rotated by the motor 62. Moreover, as shown in FIG. 6, in the attaching part 90 of the torque transmission coupler 70, a rotatable member 91 is attached to the shaft 74, and a cylindrical receiving part 94 for inserting the inserting part 68 of the driving unit 60 is attached to an end portion of the rotatable member 91. Moreover, a one-way clutch 96 (second one-way clutch) for inserting the inserting part 68 of the driving unit 60 is attached inside a hole provided in the receiving part 94. The configuration of the one-way clutch 96 is substantially the same as the configuration of the one-way clutch 54 shown in FIG. 10. In the present embodiment, the attaching part 90 constitutes a second detachable mechanism that allows the torque transmission coupler 70 to be detachably attached to the driving unit 60 along the axial direction of the shaft 74.

Moreover, in the hydraulic actuator according to the present embodiment, to maintain the state in which the inserting part 68 of the driving unit 60 has been received by the one-way clutch 96 of the torque transmission coupler 70, a second locking mechanism has been provided that fixes the driving unit 60 to the torque transmission coupler 70 with respect to an axial direction of the rotation axis 62*a*. The second locking mechanism has substantially the same configuration as that of the first locking mechanism. That is, a pushing member 92 having substantially the same configuration as that of the pushing member 51 provided to the attaching part 50 of the tool unit 10 is provided to the attaching part 90 of the torque transmission coupler 70. Moreover, ring members each having substantially the same configuration as that of each of the ring members 83, 84, 85 provided to the receiving part 80 of the torque transmission coupler 70 are provided to the receiving part 69 of the driving unit 60. Accordingly, the driving unit 60 and the torque transmission coupler 70 can be fixed to each other with respect to the axial direction of the rotation axis 62*a*.

In the present embodiment, a one-way clutch that includes balls instead of the needles can be used for the one-way clutch 96. Moreover, in the present embodiment, because it is not necessary to make the rotation of the rotatable member 91 smooth in the direction opposite to the rotation direction for driving the hydraulic pump 40, a one-way clutch having sprags can be used as the one-way clutch 96.

Moreover, instead of providing the one-way clutch 96 to the receiving part 94, which is attached to an axis end of the rotatable member 91 of the torque transmission coupler 70, the one-way clutch can be provided to an axis end of the rotation axis 62*a* of the driving unit 60. To realize this configuration, a hole is formed in a tip portion of the rotation axis 62*a* of the driving unit 60 for attaching the one-way clutch, and an inserting part for inserting into the one-way clutch is provided at an axis end of the rotatable member 91 of the torque transmission coupler 70.

Moreover, as mentioned above, in the hydraulic actuator according to the present embodiment, the attaching part 90 of the torque transmission coupler 70 has substantially the same configuration as that of the attaching part 50 of the tool unit 10, and the receiving part 69 of the driving unit 60 has substantially the same configuration as that of the receiving part 80 of the torque transmission coupler 70. Therefore, the attaching part 50 of the tool unit 10 can be attached to the receiving part 69 of the driving unit 60 directly without using the torque transmission coupler 70. That is, the hydraulic actuator can be used in the state in which the tool unit 10 and the driving unit 60 are coupled directly.

An operation of the hydraulic actuator according to the present embodiment is explained below. At first, the operator who is going to use the hydraulic actuator according to the present embodiment, carries the tool unit 10, the driving unit 60, and the torque transmission coupler 70 in a detached manner and separately to the place where the rescue operation and the like is to be performed. Then, the operator inserts the tips of the blades 32 of the tool 30 of the tool unit 10 into a small gap in an object such as a door. Then, the operator inserts the inserting part 82 of the receiving part 80 of the torque transmission coupler 70 into the one-way clutch 54 provided in the receiving part 52 of the attaching part 50 of the tool unit 10. Accordingly, as shown in FIG. 8, the attaching part 50 of the tool unit 10 is attached to the receiving part 80 of the torque transmission coupler 70. Moreover, the operator inserts the inserting part 68 of the receiving part 69 of the driving unit 60 into the one-way clutch 96 arranged in the receiving part 94 of the attaching part 90 of the torque transmission coupler 70. Accordingly, the attaching part 90 of the torque transmission coupler 70 is attached to the receiving part 69 of the driving unit 60.

Thereafter, after the tool unit 10 and the driving unit 60 are coupled via the torque transmission coupler 70 as shown in FIG. 1, the operator rotates the switching valve 48 by 90 degrees from the state of the core body 48*a* shown in FIGS. 1 to 3. Then, the operator holds the grip 65 of the driving unit 60, and the operator operates the switch 66 with his finger. As a result, the motor 62 starts operating and the rotation axis 62*a* is rotated by the motor 62. Because the inserting part 68 attached to the end portion of the rotation axis 62*a* of the driving unit 60 has been received by the one-way clutch 96 of the torque transmission coupler 70, when the rotation axis 62*a* of the driving unit 60 rotates, the rod-like shaft 74 of the torque transmission coupler 70 and the rotatable members 81 and 91 also rotate in the same direction. Furthermore, because the inserting part 82 attached to the end portion of the rotatable member 81 of the torque transmission coupler 70 has been received by the one-way clutch 54 of the tool unit 10, when the rotatable member 81 of the torque transmission coupler 70 rotates, the rotatable member 41 of the tool unit 10 also rotates in the same direction. When the rotatable member 41 rotates in this manner, the eccentric part 42 and the bearing 42*a* attached to the end portion of the rotatable member 41 rotate eccentrically around the axis of the rotatable member 41. As a result, the piston 43 moves vertically, and the pressurized oil is sent from the oil chamber 49 to the first oil chamber 45, and the tool 30 operates. Specifically, the pair of blades 32 opens as the piston rod 38 is pushed in the left direction in FIGS. 3 and 4.

When the use of the hydraulic actuator according to the present embodiment is finished at the place of the rescue operation and the like, the operator rotates the switching valve 48 by 90 degrees whereby the core body 48*a* is returned to the state shown in FIGS. 1 to 3. Thereafter, the operator holds the grip 65 of the driving unit 60. When the operator operates the switch 66 with his finger, the motor 62 starts operating thereby rotating the rotatable member 41 of the tool unit 10. When the rotatable member 41 rotates in this manner, the piston 43 moves vertically as the eccentric part 42 and the bearing 42*a* rotate eccentrically around the axis of the rotatable member 41, and the pressurized oil is sent from the oil chamber 49 to the second oil chamber 46. Accordingly, the pair of blades 32 is closed as the piston rod 38 is pushed in the right direction in FIGS. 3 and 4. Then, the operator removes the torque transmission coupler 70 from the tool unit 10 and removes the driving unit 60 from the torque transmission coupler 70. In this manner, each unit and the like of the hydraulic actuator after use can be carried separately.

According to the hydraulic actuator of the present embodiment having the above-explained configuration, the tool unit 10 is detachably attached to one end and the driving unit 60 is detachably attached to the other end of the torque transmission coupler 70, and the rotation torque generated by the driving unit 60 is transmitted to the rotatable member 41 of the tool unit 10. Moreover, the torque transmission coupler 70 includes the flexible rod-like shaft 74 and the flexible protective cover 72 that surrounds the outer peripheral surface of the shaft 74, the rotation torque generated by the driving unit 60 is transmitted to the rotatable member 41 of the tool unit 10 by rotation of the shaft 74 inside the protective cover 72. In the hydraulic actuator, the torque transmission coupler 70 is bendable as the shaft 74 and the protective cover 72 have flexibility. Therefore, because it is possible to install only the tool unit 10 in a narrow place or a place where there is a chance of occurrence of a secondary disaster at the place of the rescue operation and the like, by bending the torque transmission coupler 70, installing the driving unit 60 in a place away from the narrow place or the place where there is a chance of occurrence of the secondary disaster, and remote controlling the tool unit 10 with the torque transmission coupler 70 from a location that is away from the tool unit 10, the hydraulic actuator according to the present embodiment can be used in the narrow place or the place where there is a chance of occurrence of the secondary disaster.

The hydraulic actuator according to the present invention is not limited to the embodiments explained above and can be modified suitably.

For example, the pump of the tool unit 10 is not limited to that shown in the drawings. Although the reverse operation of the pump cannot be implemented when the one-way clutches 54 and 96 are used, a pump having a desired configuration that allows sending of pressurized oil by rotationally driving a certain structural member can be installed in the tool unit 10.

Moreover, the coupling between the tool unit 10 and the torque transmission coupler 70, or the coupling between the torque transmission coupler 70 and the driving unit 60 is not limited to a configuration in which an inserting part arranged in one unit and the like is inserted in a one-way clutch arranged in another unit and the like. For the coupling between the tool unit 10 and the torque transmission coupler 70, or the coupling between the torque transmission coupler 70 and the driving unit 60, any method other than the method of employing the one-way clutch can be used.

What is claimed is:

1. A hydraulic actuator comprising:
    a tool unit that includes
        a hydraulic pump that generates pressurized oil by rotating a rotatable member, and
        a tool operable by the pressurized oil generated by the hydraulic pump;
    a driving unit that generates a rotation torque; and
    a torque transmission coupler to a first end of which the tool unit is detachably attachable and to a second end of which the driving unit is detachably attachable and that transmits the rotation torque generated by the driving unit to the rotatable member of the tool unit, wherein
    the torque transmission coupler includes a solid flexible shaft and a flexible cover that surrounds an outer peripheral surface of the shaft,
    the rotation torque generated by the driving unit is transmitted to the rotatable member of the tool unit by rotation of the shaft inside the cover, and
    the torque transmission coupler is bendable as the shaft and the cover have flexibility.

2. The hydraulic actuator as claimed in claim 1, wherein
    a first detachable mechanism to which the tool unit can be detachably attached along an axial direction of the shaft is arranged in the first end of the torque transmission coupler, and
    a second detachable mechanism to which the driving unit can be detachably attached along the axial direction of the shaft is arranged in the second end of the torque transmission coupler.

3. The hydraulic actuator as claimed in claim 1, wherein a first one-way clutch is arranged on a first axis end of one of members between the rotatable member of the tool unit and the shaft of the torque transmission coupler to receive a second axis end of other one of the members, and the first one-way clutch includes a spring biased roller, ball, or sprag that directly contacts the second axis end when the second axis end has been received by the first one-way clutch.

4. The hydraulic actuator as claimed in claim 3, wherein, to maintain a state in which the second axis end has been received by the first axis end of one of the members between the rotatable member of the tool unit and the shaft of the torque transmission coupler, a first locking mechanism that fixes the tool unit to the torque transmission coupler in an axial direction of the rotatable member is provided in the tool unit or the torque transmission coupler.

5. The hydraulic actuator as claimed in claim 1, wherein
    the driving unit includes a motor and a rotation axis rotated by the motor,
    a second one-way clutch is arranged on a first axis end of one of members between the rotation axis of the driving unit and the shaft of the torque transmission coupler to receive a second axis end of other one of the members, and the second one-way clutch includes a spring biased roller, ball, or sprag that directly contacts the second axis end when the second axis end has been received by the second one-way clutch.

6. The hydraulic actuator as claimed in claim 5, wherein, to maintain a state in which the second axis end has been received by the first axis end of one of the members between the rotation axis of the driving unit and the shaft of the torque transmission coupler, a second locking mechanism that fixes the driving unit to the torque transmission coupler in an axial direction of the rotation axis is provided in the driving unit or the torque transmission coupler.

7. The hydraulic actuator as claimed in claim 1, wherein a material of the shaft of the torque transmission coupler is metal.

8. A torque transmission coupler for coupling a tool unit that includes a hydraulic pump that generates pressurized oil by rotating a rotatable member and a tool operable by the pressurized oil generated by the hydraulic pump and a driving unit that generates a rotation torque, the torque transmission coupler comprising:
    a solid flexible shaft; and
    a flexible cover that surrounds an outer peripheral surface of the shaft, wherein
    the torque transmission coupler is bendable as the shaft and the cover have flexibility, and the rotation torque generated by the driving unit is transmitted to the rotatable member of the tool unit by rotation of the shaft inside the cover.

9. The torque transmission coupler as claimed in claim 8, wherein
a first detachable mechanism to which the tool unit can be detachably attached along an axial direction of the shaft is arranged in a first end of the torque transmission coupler, and
a second detachable mechanism to which the driving unit can be detachably attached along the axial direction of the shaft is arranged in a second end of the torque transmission coupler.

\* \* \* \* \*